United States Patent [19]

Das et al.

[11] Patent Number: 4,978,727

[45] Date of Patent: Dec. 18, 1990

[54] CYANATO GROUP CONTAINING PHENOLIC RESINS, PHENOLIC TRIAZINES DERIVED THEREFROM

[75] Inventors: Sajal Das, Parsippany; Dusan C. Prevorsek, Morristown, both of N.J.

[73] Assignee: Allied-Signal, Morristown, N.J.

[21] Appl. No.: 271,198

[22] Filed: Apr. 12, 1988

Related U.S. Application Data

[63] Continuation-in-part of Ser. No. 41,018, Mar. 23, 1987, abandoned, which is a continuation-in-part of Ser. No. 821,658, Jan. 23, 1986, abandoned, which is a continuation-in-part of Ser. No. 104,700, Oct. 5, 1987, Pat. No. 4,831,086.

[51] Int. Cl.$^5$ .................... C08G 8/28; C08L 61/06
[52] U.S. Cl. .................... 525/504; 525/480; 525/502; 528/142; 528/146; 528/162
[58] Field of Search ........................ 525/504

[56] References Cited

U.S. PATENT DOCUMENTS

| | | |
|---|---|---|
| 3,444,137 | 5/1969 | Higginbottom et al. ............ 525/504 |
| 3,448,079 | 6/1969 | Grigat et al. ........................ 525/504 |
| 3,890,272 | 6/1975 | D'Alelio ............................... 528/162 |
| 3,929,713 | 12/1975 | D'Alelio ............................... 528/162 |
| 3,966,670 | 6/1976 | Grazen et al. ....................... 528/129 |
| 4,022,755 | 5/1977 | Tanigaichi et al. .................. 525/504 |
| 4,096,108 | 6/1978 | Webb et al. .......................... 528/129 |
| 4,118,377 | 10/1978 | D'Alelio ............................... 528/162 |
| 4,157,360 | 5/1979 | Prevorsek et al. ................... 528/125 |
| 4,218,361 | 8/1980 | Searjean et al. ..................... 528/129 |
| 4,219,452 | 8/1980 | Littlefield ............................ 528/129 |
| 4,268,657 | 5/1981 | Manzara et al. ..................... 528/129 |
| 4,281,361 | 7/1981 | Patz et al. ............................ 528/129 |
| 4,477,629 | 10/1984 | Hefner, Jr. ............................. 528/99 |
| 4,487,915 | 12/1984 | Hefner, Jr. ............................. 528/96 |
| 4,528,366 | 7/1985 | Woo et al. ........................... 528/422 |
| 4,713,442 | 12/1987 | Woo et al. ........................... 528/422 |
| 4,831,086 | 5/1989 | Das et al. ............................. 525/504 |

FOREIGN PATENT DOCUMENTS

| | | |
|---|---|---|
| 147548 | 7/1985 | European Pat. Off. . |
| 1720740 | 9/1971 | Fed. Rep. of Germany . |
| 58-34822 | 3/1983 | Japan . |
| 59-149918 | 8/1984 | Japan . |
| 1174654 | 8/1986 | Japan . |
| 85/03713 | 8/1985 | World Int. Prop. O. . |
| 87/04443 | 7/1987 | World Int. Prop. O. . |

OTHER PUBLICATIONS

Kunstoffe, Bd, 58 pp. 827–832, (1968) by R. Kubens et al.

Dokl, and Akad, Nauk SSSR. vol. 202, pp. 347–350 (1972) by V. V. Kovhak et al.

*Primary Examiner*—Earl Nielsen
*Assistant Examiner*—Frederick Krass
*Attorney, Agent, or Firm*—R. C. Stewart, II; G. H. Fuchs; E. D. Buff

[57] ABSTRACT

The present invention is a cyanato group containing phenolic resin, and method to prepare the resin. The resin of the present invention is stable and has a long shelf life. This is indicated by the gel time of greater than 1 minute, preferably greater than 2 minutes, more preferably greater than 10 minutes. The resin has substantially no smoke generation during gel time measurement at 155° C.

122 Claims, No Drawings

CYANATO GROUP CONTAINING PHENOLIC RESINS, PHENOLIC TRIAZINES DERIVED THEREFROM

RELATED APPLICATION

This application is a continuation-in part application of U.S. patent application No. 041,018 filed Mar. 23, 1987, abandoned, claiming priority of PCT/US87/00123 filed Jan. 16, 1987, which is a continuation-in-part of U.S. patent application Ser. No. 821,658, filed Jan. 23, 1986, now abandoned; and U.S. Pat. Ser. No. 104,700 filed Oct. 5, 1987, now U.S. Pat. No. 4,831,086.

BACKGROUND OF THE INVENTION

1. Field of the Invention

This invention relates to certain novel cyanato group containing phenolic resins, also known as phenolic cyanate resin and to a process of preparing same. More particularly, this invention relates to such resins which have improved properties and to a process for preparing such resins.

2. Prior Art

Phenolic resins are a class of synthetic materials that have grown continuously in terms of volume and applications for over several decades. The building blocks used in greatest volume are phenol and formaldehyde. Other important phenolic starting materials are the alkyl-substituted phenols, including cresols, xylenols, p-tert-butyl-phenol, p-phenylphenol, and nonylphenol. Diphenols, e.g., resorcinol (1,3-benzenediol) and bisphenol-A [bis-A or 2,2-bis(4-hydroxylphenyl)propane], are employed in smaller quantities for applications requiring special properties. In addition to formaldehyde, acetaldehyde or furfuraldehyde sometimes are employed but in much smaller quantities. The greater latitude in molecular structure, which is provided by varying the raw materials, chemistry, and manufacturing process, has made possible an extremely large number of applications for these products as a result of the array of physical properties that arise from the synthetic options.

The early investigation of the reaction of phenol and formaldehyde began with the work of von Baeyer and others in the early 1870's as an extension of phenol based dye chemistry. The initial experiments result in soluble, amorphous products whose properties elicited little interest. Insoluble, cross-linked products also were reported in the lates 1880's , but these products also were not perceived as useful materials. In 1888, the first patent for a phenolic-resin product intended for use as a hard-rubber substitute was granted. The first commercial product was introduced as a shellac substitute by the Louis Bluner Company in the early 1900's. Process patents were issued in 1894 and 1895 for ortho- and para-methylolphenol, respectively.

Key innovations in early phenolic-resin manufacture included control of the molecular structure and the use of heat and pressure to achieve desirable physical properties in filled compositions. Studies in the use of acidic or basic catalysts and of changes in the molar ratio of formaldehyde to phenol resulted in the definition of two classes of polymeric materials which are referred to as Bakelite resins. Caustic-catalyzed products, which are prepared with greater than a 1:1 mol ratio of formaldehyde to phenol, can be used to form cross-linked, insoluble, and infusible compositions in a controlled fashion. With less than a 1:1 mol ratio of formaldehyde to phenol, the resultant products remain soluble; furthermore, acid catalysis yields permanently stable compositions, whereas base-catalyzed materials can be advanced in molecular weight and viscosity. Possibly of greatest importance to early commercialization, however, was the reduction to practice of the use of heat and pressure to produce essentially void-free molding compositions.

Resole resins are made with an alkaline catalyst and a molar excess of formaldehyde. Novolak or novolac resins are prepared with an acid catalyst and less than one mol of formaldehyde per mol of phenol. The initial reaction involved in the preparation of resolated novolacs is carried out with an acid catalyst and less than a 1:1 mol ratio of formaldehyde to phenol. After formation of the novolac, the pH is adjusted so that the reaction mixture is basic and additional formaldehyde is added. Resoles and resolated novolaks are inherently thermosetting and require no curing agent for advancement. Novolacs, by comparison, are themoplastic and require the addition of a curing agent, the most common being either hexamethylene-tetramine or a resole. The stages of molecular weight advancement are characterized by liquid or solid phenolic polymer which is soluble in certain organic solvents and is fusible; solid resin which is insoluble but swelled by organic solvents and, although softened by heat, exhibits essentially no flow; and an insoluble, infusible product which is not swelled by solvents nor softened by heat, i.e., the system is in a highly cross-linked state.

Phenolic resins have many uses. For example, such materials are used as bonding agents in friction materials such as brake linings, clutch facings, transmission bonds and the like. For example, U.S. Pat. Nos. 4,268,157; 4,069,108; 4,268,657; 4,281,361; 4,219,452; and 3,966,670 describe various friction materials in which a phenolic resin is employed as the bonding agent. Phenolics are also used as molding materials, and as coatings and adhesives. Phenolic resins developed for non-flammability and long-term temperature stability to 230° C. have been studied in carbon-fiber composites. Potential for such composites lies in advanced aircraft application.

While present day phenolics exhibit several beneficial properties, they suffer from a number of disadvantages which restrict their utility. For example, such materials exhibit less than desirable thermal oxidative stability. Other major problems of present day phenolic technology include a need for auxiliary chemicals such as hexamethylenetetramine to crosslink the phenolic which often results in the production of volatile by-products such as ammonia during crosslinking is often extensive and is not controllable.

Various modifications to phenolics have been proposed to obviate certain of the disadvantages attendant to these resins. For example, epichlorohydrin has been reacted with the hydroxyl groups of novolak forming epoxy novolak. Moreover, n-chloro-2-propene has been reacted with the hydroxyl groups of novolac to form the corresponding form methylon resin.

Japanese Patent Publications Nos. 59-149918, and 58-34822 describe a method of preparing a phenolic resin containing cyanate groups. In this method, a trialkyl ammonium salt of a phenol novolak is reacted with excess cyano halogen in an organic solvent such as methylene chloride. The ammonium by-product salt is separated from the reaction mixture by extraction with water. Several disadvantages are attendant to the process of these references. The reaction is limited to being conducted in a water immiscible solvent. As a result it suitable only for cyanation of low molecular weight novolac resin below 320 Mn. We have found that the method disclosed in these references results in a phenolic cyanate resin which release smoke (volatiles) during curing at 155° C. or above.

U.S. Pat. No. 3,448,079 describes aromatic cyanic acid esters produced by the reaction of phenolic resins with cyanogen halide in which the hydroxyl groups of the phenol-formaldehyde resins are replaced with cyanic acid ester groups, and process for producing same. U.S. Pat. No. 3,444,137 describes curable phenol-aldehyde resins characterized by molecules which contain a cyano group, an amine nitrogen atom, a phenyl group and a substituted hydroxyl group, such molecules having been made by reacting a phenol, formaldehyde and a cyano substituted primary or secondary amine. U.S. Pat. No. 4,022,755 describes cyanato-group containing phenol resins, and a process for preparing same. U.S. Pat. No. 4,713,442 discloses a polytriazine which comprises 1,3,5-triaryloxytriazines. Polyaromatic cyanates are also disclosed in EPA No. 0 147 548, W)085/03713 and GB-No. A1218447.

Cyanato group containing phenolic resins have been described in Delano, et al, *Synthesis of Improved Phenolic Resins,* Acurex Corp/Aerotherm, Acurex Vinyl Report 79-25/AS, Sept. 4, 1979 prepared for NASA Lewis Research Center, Contract No. Nas3-21368, and is available through the United States Department of Commerce National Technical Information Service.

A recent reference, Heat Resistance Polymers by Critchley, et al, pp. 406-408 Plenum Press, New York, 1986 has described phenolic triazine resins prepared from phenolic novolac or meta-cresol novolac which have essentially the same chemical structures as described in the above referenced patents.

The phenolic triazines which have been disclosed have been found to have high thermal stability. However they have not been commercially produced because of poor shelf life, and a gel time too short for processing using conventional plastic processing equipment. It has been found as illustrated below, that reproduction of the phenolic cyanate ester resins disclosed in the art are unstable and not suitable for commercial applications such as matrix for various composites, impregnation media for paper and nonwovens, adhesives, coatings, etc. When these unstable resins are converted into a crosslinked product (phenolic triazines) mechanical properties have been observed to be poor. The cured resins are so brittle, that frequently a suitable test sample for property determination cannot be fabricated. It has been found that curing the phenolic cyanate ester resins prepared according to the disclosures in the art, generates smoke and volatile chemicals.

Various new polymers have been proposed. For example, Kunstoffe, Bd, 58, pp. 827-832 (1968) by R. Kubens, et al. and Dokl, and Akad, Nauk SSR Vol. 202, pp. 347-350 (1972) by V. V. Kovshak, et al. describe the "cyclotrimerization" of aryl cyanurate and properties of crosslinked polymers derived therefrom. The term "cyclotrimerization" is meant, forming a cyanurate ring system by chain extension polymerization of three aromatic cyanurate groups to form a crosslinked triazine ring system Similarly, U.S. Pat. Nos. 3,890,272; 4,118,377; and 3,929,713 describe the formation of poly (bismaleimides) and the properties of such polymers.

U.S. Pat. No. 4,157,360 describes thermoformable compositions comprising a crosslinked polycyanurate polymer and a thermoplastic polymer in which the poly cyanurate is formed by a polycyclotrimerization reaction.

Phenolic cyanate resins have, according to their structural potential to form crosslinking products with outstanding thermal, oxidative stability as well as very high char yield upon heating to very high temperatures (900°-1,000° C.). However, resins prepared according to the teachings in the art have failed to yield products with these mechanical and thermal properties. Phenolic cyanato polymers (resins) have been found to give off smoke from volatiles upon curing. The volatiles include harmful irritants such as diethyl cyanamide. The present invention overcomes the shortcomings that have held back this potentially valuable resin from widespread commercial use.

SUMMARY OF THE INVENTION

The present invention is directed to a modified phenolic cyanate resin of the Formula I.

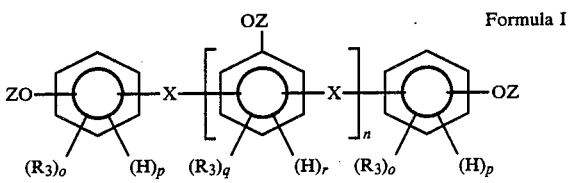

wherein:

n is a positive whole number greater than or equal to 1;

q and r are the same or different at each occurrence and are whole numbers from 0 to 3, with the proviso that the sum of q and r at each occurrence is equal to 3;

Z is —CN, or hydrogen and —CN;

o and p are the same or different at each occurrence and are whole numbers from 0 to 4 with the proviso that the sum of o and p at each occurrence is equal to 4;

—X —is a divalent organic radical; and $R_3$ is the same or different at each occurrence and is a substituent other than hydrogen which is unreactive under conditions necessary to completely cure the copolymer.

There is from 5 to 100, preferably 10 to 100, more preferably 50 to 100, most perferably 70 to 100 and yet more preferably 80 to 95 mole % -OCN groups based upon the sum of the moles of the —OCN and —OH groups.

The resin of the present invention is processable using conventional plastic processing equipment and has a long shelf life. This is indicated by the gel time of greater than 1 minute, preferably greater than 2 minutes, more preferably greater than 10 minutes at 155° C. The gel time can be greater than 20 minutes at 155° C. There is substantially no smoke generation during gel time measurement at 155° C. The improved phenolic cyanate resin of the present invention can react to form a phenolic triazine characterized as having a thermal stability indicated by thermal decomposition temperature of at least 400° C. and preferably of at least 450° C. as measured by Thermal Gravimetric Analysis (TGA).

It is believed that the improved properties attained by the cyanato group containing phenolic resin of the present invention result is at least in part, from the resin having low residual amounts of dialkyl cyanamide which is typically a diethyl cyanamide. There is preferably less than 2% by weight, more preferably less than 1% by weight, and most preferably substantially no dialkyl cyanamide. Triethyl amine reacts with the cyanogen halide to form diethyl cyanamide. This side reaction is an undesirable waste of the reactants. This side reaction can be minimized by conducting the reaction to form the cyanato group containing phenolic resins at from −5° C. to −45° C. Traces of dialkyl cyanamide formation during the cyanation reaction can be removed by purification, typically during precipitation. Dialkyl cyanamide is an undesireable volatile material which is a harmful irritant.

An additional embodiment of the present invention is one where the residual amounts of phenyl cyanate is less than 2% by weight and preferably less than 1% by weight and most preferably 0.5% by weight.

The cyanato group containing phenolic resin of the present invention preferably has a number average molecular weight of from about 320 to about 1500, preferably about 500 to 1000 and more preferably about 600 to 1000. With reference to Formula I a preferred embodiment is where n is from 6 to 10 and more preferably from 6 to 8.

Precured compositions can be made containing the modified phenolic resin of Formula I, and to cured, partially cured, completely cured and incompletely cured compositions formed by "cyclotrimerization" of the cyano group of the modified phenolic resin of Formula I to varying degrees and such compositions formed by reaction of the cyano groups modified resin of Formula I with a suitable bismaleimide to varying degrees. As used herein, "completely cured" modified phenolic resins are those in which less than about 20 mole percent of the original cyano groups remain unreacted, i.e. uncyclotrimerized, as determined by the method of infrared spectrophotometry; "precured" modified phenolic resins are those in which substantially about 100 mole percent of the original cyano groups are unreacted, i.e. uncyclotrimerized, as determined by the method of infrared spectrophotometry; "partially cured" modified phenolic resins are those in which from about 40 to about 70 mole percent of the original cyano groups are unreacted, i.e. uncyclotrimerized, as determined by infrared spectrophotometry; and "incompletely cured" modified phenolic resins are those in which from about 40 to about 20 mole percent of the original cyano groups are unreacted, i.e. uncyclotrimerized, as determined by infrared spectrophotometry.

Still, another aspect of this invention relates to precured, partially cured, incompletely cured and completely cured compositions comprising said phenolic resin in admixture with one or more other materials as for example, thermoset and thermoplastic polymers such as kevlar and polyethylene, particulate and fibrous inorganic fillers as for example asbestos, mica, boron, carbon, and like.

The cured resin derived from modified phenolic resin of this invention, and the modified phenolic resin of this invention exhibit several advantages over conventional phenolic resins. For example, certain of these materials are self crosslinking, and thus do not require auxilliary chemicals for crosslinking. Moreover, the cross-linked, i.e. cured, resins of this invention have excellent oxidative, mechanical and thermal stability, and no volatile, potentially environmentally hazardous by-products are produced during crosslinking. This is shown by substantially no smoke or volatile generation during gel time measurement at 155° C. Furthermore, the claimed cured phenolic resins of this invention have high char forming properties.

The present invention includes an improved method of making the cyanato group containing phenolic resin of the Formula I. The improvement of the method of the present invention is that the cyanato group containing phenolic resin is formed by first reacting novolac resin and a base, preferably trialkyl amine in a cyclic ether solvent to form a trialkylammonium salt of novolac. This step is then followed by reacting the trialkylammonium salt with a cyanogen halide in the cyclic ether to form the cyanato group containing phenolic resin. The reaction product is preferably separated by precipitation using non-solvent vehicle such as an alcohol with isopropanol being preferred. It is particularly preferred to conduct the reaction at a temperature below about −5° C. and preferably from −5° C. to −45° C., more preferably −5° C. to −30° C. and most preferably −15° C. to −30° C.

A particularly preferred embodiment of the present invention is the precipitation of the reaction product of a novolac resin with a base and a cyanogen halide in a nonsolvent vehicle, preferably an alcohol, and most preferably isopropanol.

DESCRIPTION OF THE PREFERRED EMBODIMENTS

The present invention is a cyanato group containing phenolic resin; a phenolic triazine resin derived therefrom; and a method to make the cyanato group containing phenolic resin of the present invention. The cyanato group containing phenolic resin of the present invention has improved gel time and long shelf life. It has low volatiles, and excellent char yield and thermal properties.

One type of partially cured, completely cured or incompletely cured phenolic resin of this invention is formed by cyclotrimerization of a modified phenolic resin of the Formula I:

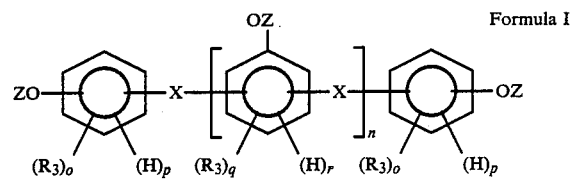

Formula I wherein $R_3$, n, q, r, a, o, P and X are as described above. By the term "polycyclotrimerization" is meant forming a cyanurate ring system by the chain extension polymerization of three aromatic cyanate groups to form the crosslinked triazine ring system which comprises the following basic repeat unit of the Formula II:

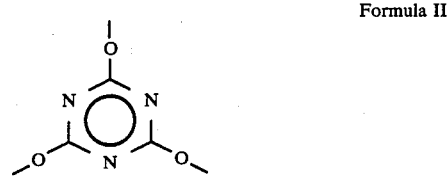

Formula II wherein the open valencies are bonded to a phenyl ring of a phenolic cyanate resin. The methods of conducting the polycyclotrimerization of cyanurate compounds are well known in the art, and include thermal annealing which can be conducted above about 200° C. For example, such methods are described in Kunststoffe, BD, 58, pp. 827-832 (1968) by R. Kubens et al and Pokl AK ad Nauk SSSR, vol 202, pp. 347-350 (1972) by V. V. Korshak et al and U.S. Pat. No. 4,157,360 which are hereby incorporated by reference. For example, an appropriate modified phenolic resin of the above Formula I can be crosslinked, preferably neat, with or without an acceptable catalyst at elevated temperatures.

The cyanato group containing phenolic resin of the present invention has the Formula I has a gel time of greater than 1 minute, preferably 2 minutes, more preferably greater than 10 minutes. The gel time can be greater than 20 minutes at 155° C.

An alternate way of measuring the improvement of the present invention is by the resin being capable of forming a phenolic triazine resin having the thermal stability of at least 400° C. and preferably of at least 450° C. as measured by Thermal Gravimetric Analysis (TGA). The phenolic triazine resin of the present invention has a char value at 900° C. of at least 50% by weight, preferably from 50 to 70% by weight, and more preferably 60 to 70% by weight.

It is believed that the improved properties of the resin of the present invention are attributed to the resin having a residual amount of a dialkyl cyanamide, typically diethyl cyanamide of less than 2% by weight, preferably less than 1% by weight and most preferably substantially none. The diethyl cyanamide is undesirable because it generates smoke, volatiles, upon curing.

Preferably the cyanato group containing phenolic resin has a residual amount of phenyl cyanate of less than 2% by weight and preferably less than 1% by weight and most preferably less than 0.5% by weight. This is desirable since it has been found that the phenol cyanate is a volatile material that contributes to the formation of smoke, volatiles, during curing of the resin.

The present invention includes a method to make the cyanato group containing phenolic resin recited above. This involves the steps of reacting novolac resin and a trialkyl amine in an solvent, preferably a cyclic ether solvent to form the trialkylammonium salt of novolac. This is followed by reacting the trialkylammonium salt with a cyanogen halide in the cyclic ether to form the cyanato group containing phenolic resin. The method is conducted at a temperature range of below −5° C., preferably from −5° C. to −45° C., more preferably from -5° C. to −30° C. and most preferably from −15° C. to −30° C.

The reaction product is in solution in the cyclic ether. This reaction produce is a cyanato groups containing phenolic resin. It is separated from the solution by a suitable separation technique. The preferred technique is precipitation into a non solvent vehicle. Useful nonsolvents are alcohols with isopropanol being preferred. The separation is preferably conducted at atmospheric pressure. While it can be conducted at room temperature, the temperature is typically from −0° C. to −45° C., preferably −5° C. to −25° C. Precipitation is preferably conducted with agitation.

The method of the present invention results in a cyanato group containing phenolic resins having an unexpected improvement over the art. This is believed to result at least in part, from the order of the addition of the reactants. The prior art describes making cyanato containing phenolic resins by adding a trialkyl amine to a solution of a novolac resin and a cyanogen halide. The prior art does not recognize the importance of reacting the novolac resin in a trialkyl amine prior to adding the cyanogen halide in a water or alcohol miscible solvent, preferably cyclic ether solvents. The prior art method is described as adding trialkyl amine to a mixture of novolac resin in cyanogen bromide. This tends to form a diethyl cyanamide which consumes the triethyl amine. It also creates instability and high boiling impurities which are difficult to remove.

The cyanato group containing phenolic resin of the present invention results in satisfactory cured triazine materials regardless of molecular weight. The preferred molecular weight range is a number average molecular weight of 320 to about 1500, more preferably about 500 to 1000 and most preferably from about 700 to 1000. Considering Formula I, the cyanto group containing phenolic resin preferably has n being from 6 to 10 and more preferably 6 to 8. The molecular weight distribution and number average molecular weight of the cyanato group containing phenolic resin can be determined by gel permeation chromatography(GPC) using tetrahydrofuran as a solvent A useful incompletely cured polymer has from about 10 to about 20 mole % of original the phenolic groups from the phenolic resin reacted to form triazine moieties, from about 60 to about 90 mole % of the original phenolic groups from the phenolic resin substituted with —OCN groups and from about 0 to about 20 mole % of the phenolic groups remain as —OH groups, said mole % based on the total moles of the original phenolic groups in the original phenolic resin.

The cyanato group containing phenolic resins forms a phenolic triazine network upon heating and/or in the presence of a curing agent. The threshold polymerization temperature can vary widely depending on a number of factors, as for example, time, and the presence or lack of a catalyst, the type of catalyst when used, and the like. In general, the threshhold polymerization temperature depends on the level of substitution of —OCN groups for —OH groups in the original phenolic resin Where substantially all of the -OH groups are converted to -OCN, and the gel time is greater than 20 minutes at 155° C. than the threshold polymerization temperature is equal or greater than about 150° C., and typically equal or greater than 175° C. Threshold polymerization temperature has been measured suing a DuPont Model 9900 Differential Scanning Calorimeter. The threshold temperature is indicated by the onset of the curing exotherm. The peak indicates the maximum polymerization temperature. In the preferred embodiments of the invention, the polymerization or curing temperature is from about 100° C. to about 350° C., more preferably from about 100° C. about 300° C., and most preferably 150° to 280° C. Amongst these particularly preferred embodiments, most preferred are those embodiments in which the polymeriation temperature is from about 200° C. to about 250° C. Useful curing pressures can be from 300 to 500 psi for 5 minutes to 1 hour depending on sample size. Heating can be accomplished by conventional methods know to those of skill in the art. Illustration of such methods are heating with an oil bath, vacuum, hot air annealing, compression molding and the like.

The polymerization can be carried out in the presence of a catalytically effective amount of a catalyst. Useful catalyst can vary widely and include anhydrous metal salts such as stannous chloride dihydrate, cuprous bromide, cuprous cyanide, cuprous ferricyanide, zinc chloride, zinc bromide, zinc iodide, zinc cyanide, zinc ferrocyanide, zinc acetate, zinc octate, silver chloride, ferrous chloride, nickel chloride, ferric chloride, cobaltous cyanide, nickel sulfate, stannic chloride, nickel carbonate, and the like. Also useful as catalyst are protondonating organic reducing agents such as tetrahydropyridine, hydroquinone, 4,4-biphenol and the like. Amounts of the catalyst when used are not critical and can vary widely prided that the amount is sufficient to catalyze the reaction to the desired extent Reaction pressures are not critical and can vary widely. The reaction can be carried out at subatmospheric, atmospheric or super-atmospheric pressure. However, for convenience, the reaction is carried out at autogenous pressure or atomospheric pressure.

The other cured phenolic resin of the this invention can be prepared by reacting a bismaleimide of the formula

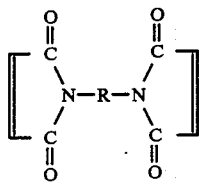

with the modified phenolic resin of this invention of the Formula I.

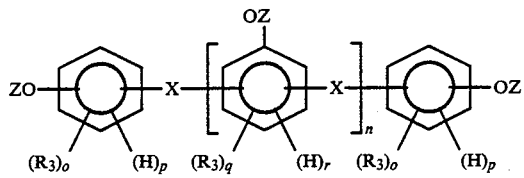

wherein —R —, Z, —X—o, p, q, r, n and $R_3$ are described above. This reaction is carried out by reacting appropriate amounts of the reactants at elevated temperatures. Reaction temperature and pressure are not critical and can vary widely. In the preferred embodiments of the invention, the reaction is carried out at a temperature of about 100° C. to about 200° C. at atmospheric or autogenous pressure. The ratio of the reactants are not critical and will depend on the degree of crosslinking, i.e., curing or cyclotrimerization, desired.

Suitable —R— groups in the above recited bismaleimide include divalent aromatic and aliphatic moities. Illustrative of such groups are aliphatic groups such as ethylene, 2,5-dimethylhexanethylene, 4,4-dimethylheptanethylene, methylene, 2,2'-diethylene sulfone, 2,2'-diethylene sulfide, 3,3'-dipropylene sulfone, 3,3'-dipropylene ether, 1,3-propylene, 1,4butylene, 1,8-octalene, 1,3-butylene, 1,6-hexylene, 1,7-heptalene, 1,5-pentylene, 1,10-decalene, 3methylheptamethylene, 2,2-dimethyl-1,3-propylene and the like; cycloaliphatic groups such as 1,3-cyclopentyl, 1,4-cyclohexyl, 1,4-dimethylene cyclohexylene and the like; arylene such as 1,5-naphthalene, 1,4-phenylene, 1,3-phenylene, biphenylene, 1,3-benzene-dimethylene, 1,4-benzenedimethylene, 1,2-benzene-dimethylene, 2,2-bis-(4-phenylene) propane, bis-(4-phenylene) methane, 4,4'-phenylenepropane, 4,4'-phenylene sulfide, 4,4'-phenylene ether, 4,4'-phenylene sulfone, 4,4-diphenylene dimethylene and the like; and alkylene terminated polydiorganosiloxanes such as bis-(3-propylene) tetramethyldisiloxane, bis-(4-butylene) tetramethyldisiloxane, and the like.

In the structure of Formula I, $R_3$ is an inert substituent. Illustrative of suitable $R_3$ groups are such inert substituents as halogen, trihalomethyl, alkyl, alkoxy, phenyl and the like.

Illustrative of suitable —X— groups are alkylene such as methylene, ethylmethylene, 2-ethylpentylmethylene, methylmethylene, isopropylmethylene, isobutylmethylene, pentylmethylene, and furylmethylene, and the like; arylenes such as 1,3-benzenedimethylene, phenylmethylene, 1,4-benzenedimethylene, 2,2-bis-(4-phenylene)propane, 4-methoxyphenylmethylene, bis-(4-phenylene)methane, 4,4-diphenylene dimethylethane; and cycloalkylenes such as cyclohexylene, cyclooctylene, and 1,3-cyclohexanedimethylene, and the like.

Preferred Formula I are those embodiments in which:
Z is —CN, or hydrogen and —CN; preferably when Z is hydrogen and —CN from about 20 to about 100 mole percent of the Z moieties are —CN;
—X is substituted or unsubstituted methylene or 1,4-phenyldimethylene wherein permissible substitutents are alkyl or furyl;
q and r are the same or different at each occurrence and are positive whole numbers from 0 to 3, with the proviso that the sum of q and r is 3;
$R_3$ is alkyl; and
0 n is a positive number from 1 to about 10;
o and p are the same or different at each occurrence and are positive whole numbers from 0 to 4, with the proviso that the sum of o and p is 4.

Amongst the preferred embodiments particularly preferred are those embodiments of above Formula I in which:
Z is hydrogen, or hydrogen and —CN with the proviso that from about 30 to about 80 mole percent of Z moieties are —CN;
—XX—is methylene, methylene substituted with alkyl having from about 1 to about 10 carbon atoms, halogen or furfuryl, or xylene;
$R_3$ is methyl or ethyl;
o is 0 or 1;
p is 0 or 1;
n is 6 to about 10, and more preferably 6 to 8;
q is o or 1;
r is 1 to 3; and
p is 1 to 4.

Other preferred embodiments, are those embodiments wherein
n is 1 to about 5;
Z is —CN or hydrogen with the proviso that from about 40 to about 45 mole percent Z moieties are CN;
q is 0;
o is 0; and
X is methylene or methylene substituted with furfuryl, alkyl having from 1 to about 10 carbon atoms, or halogen, or is a moiety of the formula:

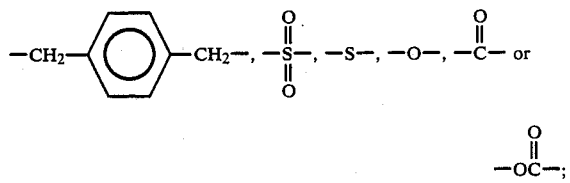

r is 3; and p is 4.

Another embodiment of this invention are those in which the partially, completely and incompletely cured resin is formed by reaction with the bismaleimide compounds. In these embodiments, it is preferred that the bismaleimide compound be selected from the group consisting of those of the formula:

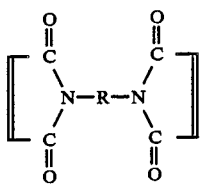

wherein:

—R— is a divalent organic radical selected from the group consisting of (a) divalent aromatic hydrocarbon radicals having from about 6 to about 20 carbon atoms and halogenated derivatives thereof, (b) divalent alkylene radicals and cycloalkylene radicals having from about 2 to about 20 carbon atoms, (c) divalent polydiorganosiloxanes terminated with alkylene having from about 2 to about 8 carbon atoms, and divalent radicals of by the formula:

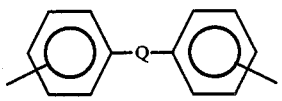

where Q is a member selected from the class consisting of;

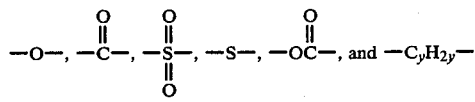

where Y is a positive whole number; and that n, Z, q, o, p, r, —X— and $R_3$ are as in the preferred cyclotrimerized embodiments described above. In the particularly preferred embodiments of this aspect of the invention —R— is a divalent radical of the formula;

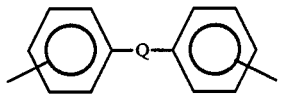

and N, Z, q, 0, p, r, —X—, and $R_3$ are as described above for the particularly preferred cyclotrimerized embodiment.

A reinforced and/or filled composition comprising the completely cured, partially cured, and incompletely cured phenolic triazine/phenolic cyanate copolymer of this invention, as well as the compositions which may be used in the preparation of such reinforced compositions are also part of the invention disclosed herein. The completely cured, precured, partially cured, and incompletely cured compositions as described, may contain fillers for use in where the structural strength and integrity of a structure has to be maintained, and for other purposes known to those of skill in the art. Any suitable filler known to those of skill in the art can be used. Such fillers may be selected from a wide variety of organic and inorganic materials such as polymers, minerals, metals, metal oxides, siliceous materials and metal salts. Illustrative of useful fillers are fiber glass, steel, asbestos fibers, aramide, boron and carbon fibers, as well as plate like, fibrous and particulate forms of alumina, brass powder, aluminum hydrates, iron oxide, feldspar, lead oxides, asbestos, talc, barytes, calcium carbonates, clay, carbon black, quartz, novaculite and other forms of silica, koalinite, aluminum silicate bentonite, garnet, mica, saponite, beidelite, calcium oxide, and fused silica, calcium hydroxide. Other useful fillers include thermoplastic polymer, as for example, polyesters, polyimides, polyamides, polysulfones, polyaramids, polyester carbonates, polyethers, polyethersulfones, polyethylene, polypropylene, polycarbonates, polyetherimides, polysulfides, polyacrylates, and polyvinyls. The foregoing recited fillers are illustrative only and are not meant to limit the scope of the fillers that can be utilized in this invention. Methods for producing reinforced and/or filled compositions include melt blending, extrusion and molding processes, simple mixing and dispersion of both materials in suitable medium by methods known in the art.

The phenolic cyanate resin of the invention depicted in Formula I is prepared by a nucleophilic displacement reaction. In this reaction, a cyanogen halide, preferably cyanogen chloride or cyanogen bromide, is reacted with a base such as an alkali metal phenolic salt or a trialkyl ammonium salt of the formula III.

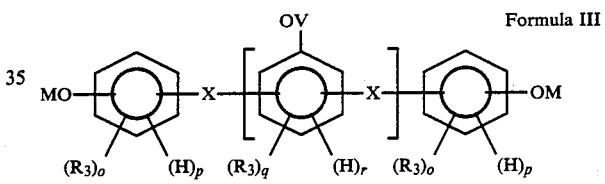

Formula III wherein $R_3$, —X—, q, r and n are as defined above, M is an alkali metal salt, or trialkyl ammonium and V is M or hydrogen, preferably under nitrogen in the presence of an aprotic solvent.

Reaction temperatures can vary widely. Preferred reaction temperatures are from about 0° C. to about 120° C. with agitation and more preferably from about 0° C. to about 30° C.

Useful solvents can vary widely. The solvent is inert under the reaction conditions. Illustration of solvents useful in the conduct of this reaction are water, N,N-dimethyl acetamide, N,N-dimethyl formamide, N-methyl-2 pyrrolidone, propyl carbonate, cyclohexane, xylene, carbon tetrachloride, benzene, and dimethyl sulfoxide, ethers such as diglyme, and cyclic ethers with cyclic ethers preferred. Preferred cyclic ethers include tetrahydrofuran, 1,4 dioxan, and furan. The most preferred solvent is tetrahydrofuran. The cyclic ethers are preferred since low and higher molecular weight phenolic cyanate resins can be made, i.e. greater than about 600 Mn. (i.e. n>6)

Reaction times can vary considerably and will depend upon such factors as the degree of agitiation, temperature, time, nature and proportion of reactants and the like. The reaction product can be recovered by conventional means. For example, the crude polymeric product can be precipitated by pouring the reaction mixture into a non solvent vehicle. A non solvent vehicle is defined to be a liquid medium in which the phenolic cyanate resin reaction product is insoluble and nonreactive. Preferred non solvent vehicles include alcohols, more preferably organic alcohols such as propanol, butanol, methanol, ethanol, glycol, polyglycol, with isopropanol being most preferred. The product can then be dried in vacuum over for 24 hour.

The cyanato group containing phenolic resin of the present invention is preferably derived from a phenolic novolac. Useful phenolic novolac resins are known in the art. A typical and useful one is disclosed in U.S. Pat. No. 4,022,755 at column 2 beginning at line 27. Particularly useful phenols include phenol, cresol and xylenol.

The cyanato group containing phenolic resin of the present invention has a gel time measured by the Hot Plate Stroke Cure Method (see Examples) of greater than 1 minute, preferably greater than 2 minutes, more preferably greater than 10 minutes at 155° C. The gel time can be greater than 20 minutes at 155° C. The cyanato group containing phenolic resin of the present invention should be capable of forming a triazine resin have the thermal stability of at least 400° C., and preferably at least 450° C. as measured by Thermal Gravimetric Analysis.

The stability of the resin of the present invention results in part from the method of the present invention. The method results in a minimum of residual impurities which result in thermal instability and short gel time so as to have short shelf life. The resin should have a residual amount of diethyl cyanamide of less than 2% by weight, preferably less than 1% and more preferably none.

Another impurity that is detrimental is phenol cyanate. This is a volatile material which results in smoke and volatile chemicals during curing. The resin should have a residual amount of phenol cyanate of less than 2% by weight and preferably less than 0.5% by weight.

The polymerization is induced thermally. The threshhold polymerization temperature can vary widely depending on a number of factors, as for example, the presence or lack of a catalyst, the type of catalyst when used, the presence of free hydrogen groups and the like. In general, the threshhold polymerization temperature is defined above. In the preferred embodiments of the invention, the polymerization temperature is from about 100° C. to about 350° C., and in the particularly preferred embodiments is from about 100° C. to about 300° C. Amongst these particularly preferred embodiments, most preferred are those embodiments in which the polymerization temperature is from about 120° C. to about 250° C. Heating can be accomplished by conventional methods known to those of skill in the art. Illustration of such methods are heating with an oil bath, vacuum, hot air annealing and compression molding.

The polymerization is preferably carried out in the presence of a catalytically effective amount of a catalyst. Useful catalyst can vary widely and include anhydrous metal salts such as stannous chloride dihydrate, cuprous bromide, cuprous cyanide, cuprous ferricyanide, zinc chloride, zinc bromide, zinc iodide, zinc cyanide, zinc ferrocyanide, zinc acetate, silver chloride, ferrous chloride, nickel chloride, ferric chloride, cobaltous cyanide, nickel sulfate, stannic chloride, and nickel carbonate. Also useful as catalyst are proton-donating organic reducing agents such as tetrahydropyridine, hydroquinone and 4,4-biphenol. Amounts of the catalyst when used are not critical and can vary widely provided that the amount is sufficient to catalyze the reaction to the desired extent.

Reaction pressures are not critical and can vary widely. The reaction can be carried out at subatmospheric, atmospheric or super-atmospheric pressure. However, for convenience, the reaction is carried out at autogenous pressure or atmospheric pressure.

During the esterification of the phenolic resin, we have discovered that in addition to formation of —OCN moieties, carbamate moieties may be formed by reaction of —OCN functions with active hydrogen containing materials such as $H_2O$ and $C_2H_5OH$ forming the carbamate functions —$C(O)NH_2$ or —$C(OH)=NH$, and —$C(OC_2H_3)=NH$ respectively. In addition, when amines are employed as the base catalyst in the preparation of the phenolic cyanate as will be described in more detail below, dicyanamides as for example, $(C_2H_5)_2$ NCN, may form in the phenolic cyanate and consequently will be a contaminant in the desired phenolic cyanate/phenolic triazine copolymer. We have also discovered that the mole % of carbamate functions substituted to phenyl groups of the phenolic cyanate precursor used in the preparation of the phenolic triazine/phenolic cyanate copolymer of this invention and/or the amount of dicyanamide formed during the preparation of the phenolic cyanate precursor are critical to the processibility of the copolymer.

In general, the mole % of phenyl groups substituted with carbamate functions is equal to or less than about 20 mole % based on the total moles of phenyl groups present in the phenolic cyanate resin, and the weight percent of dicyanamide present in the copolymer is equal to or less than about 20 weight percent based on the total weight of the resin. In the preferred embodiments of the invention, the mole % of phenyl groups substituted with carbamate functions is equal to or less than about 10 mole % based on the total moles of phenyl groups, and the weight percent of dicyanamide present in the resin is equal to or less than about 5 weight percent based on the total weight of the resin. In the particularly preferred embodiments of the invention, the mole % of phenyl groups substituted with carbamate functions is equal to or less than about 5 mole % based on the total moles of phenyl groups, and the weight percent of dicyanamide present in the resin is equal to or less than about 2 weight percent based on the total weight of the resin. In the most preferred embodiments of the invention, the mole % of phenyl groups substituted with carbamate functions is equal to or less than about 2 mole % based on the total moles of phenyl groups, and the amount of dicyanamide present in the copolymer is less than about 1 weight percent based on the total weight of the resin; with those embodiments of the invention in which substantially no phenyl groups are substituted with carbamate functions and in which substantially no dicyanamide is contained in the resin being the embodiments of choice.

The present invention includes a method to make the cyanato group containing phenolic resin as described above. The improved properties of the resin made from the preferred method of the present invention are due to reacting the novolac resin and a trialkyl amine in a cyclic ether solvent to form the trialkylammonium salt of novolac resin this is followed by reacting the trialkylammonium salt with a cyanogen halide in the cyclic ether to form the cyanato group containing phenolic resin. The reaction is conducted at below about −5° C., preferably to −5° C. to −45° C., more preferably from −5° C. to −30° C. and most preferably from −15° C. to −30° C.

The cyclic ether solvent has been found to be an important reaction medium to form the cyanato group containing phenolic resin of the present invention. The cyclic ether solvent is preferably selected from the group consisting of: tetrahydrofuran; 1,4 dioxan; and furan. The trialkyl amine can be selected from triethyl amine, tripropylamine and triethylcyclohexyl amine. Additionally, the reaction medium can contain other bases to control the pH to help control the rate of the reaction.

The relative amounts of solvent i.e. tetrahydrofuran, trialkylamine, and phenolic resin used should be controlled to control gel time of the cyanato group containing phenolic resin. Concentrations can be measured as a function of the weight percent of the trialkyammonium salt which could be calculated based on the weight of the trialkylamine, phenolic resin and solvent. Preferably, the amount of trialkylammonium salt is from 5 to 35, more preferably 10 to 25, and most preferably from 10 to 20 percent by weight. The preferred concentration can vary depending on the specific solvents and reactants used.

The phenolic cyanate resin used as the precursor in the preparation of the phenolic cyanate polymer of this invention is prepared by a nucleophilic displacement reaction through use of the process of this invention. In this reaction, a cyanogen halide, preferably cyanogen chloride or cyanogen bromide, is reacted with a base phenolic salt of Formula IV:

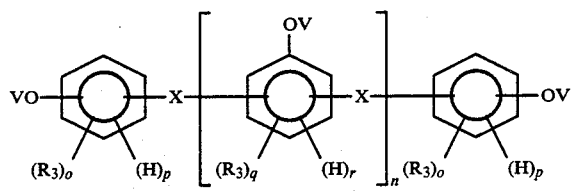

Formula IV wherein $R_3$, —X—, o, p, q, r and n are as defined above, and V is hydrogen or cation of an organic or inorganic base which is formed by reaction between said base and the protons of a phenolic to form the corresponding basic salt, wherein the mole ratio of cations to hydrogen are sufficient to form the desired mole % of —OCN groups in the desired phenolic cyanate. V is preferably trialkyl ammonium. The reaction is preferably under nitrogen in the presence of an aprotic solvent in which the salt and cyanogen halide are soluble in the substantial absence of materials having active hydrogens.

We have discovered that the reaction temperature has a significant impact on the mole percent of carbamate formed during the formation of the phenolic cyanate. Reaction temperatures can vary widely provided that they are less than about 0° C. It is believed that use of higher temperatures will result in the undesireable formation of diethyl cyanamide. Preferred reaction temperatures are equal to or less than about −5° C. and more preferably are equal to or less than about −10° C. In the most preferred embodiments of the invention, reaction temperatures are equal to or less than about −15° C.

It is also preferred that isolation and purification procedures preferably avoid the use of temperatures in excess of about 0° C. In the more preferred embodiments of the invention, temperatures in excess of about −5° C. are avoided in the isolation and purification of the product, and in the most preferred embodiments temperatures in excess of about −10° C. are avoided. The use of temperatures in excess of those specified above during the reaction, and processing and isolation step results in the presence of an unacceptably large amount of carbamate functions.

Useful solvents can vary widely, with cyclic ethers preferred. The solvent should be inert under the reaction conditions and the reactants are soluble in the solvent. In this respect, the process of this invention differs significantly from the processes of Japan Kokai Nos. 59-149918 and 58-34822 in which the process is carried out in solvents such as methylene chloride in which relatively high molecular weight novolac salt is insoluble.

Illustration of aprotic solvents useful in the conduct of this reaction are amides such as N,N-dimethyl acetamide, N,N-dimethyl formamide, and N-methyl-2 pyrrolidone; ketones such as methyl ethyl ketone, and ethyl propyl ketone; organic carbonates such as propyl carbonate; ethers such as diglyme, tetrahydropyran, 3-methyltetrahydrofuran, tetrahydrofuran, and glyme; organic sulfur containing compounds such as dimethyl sulfoxide, sulfones and sulphonates; and chlorinated hydrocarbons such as methylene chloride, carbon tetrachloride and chloroform. The preferred solvents are ethers, and, particularly preferred solvents are cyclic ethers such as tetrahydrofuran, dioxan, and furan and diethers such as glyme or diglyme.

Reaction times can vary considerably and will depend upon such factors as the degree of agitation, temperature, nature and proportion of reactants and the like. Reaction times can be from about 4 hours to about 6 hours. The reaction product can be recovered by conventional means with substantially anhydrous conditions. Usually, the salt by-product is separated from the dissolved product by filtration. If solid when neat, the product can be isolated from solution using standard precipitated techniques using a nonsolvent vehicle. If liquid when neat, the product can be conveniently isolated and purified by conventional distillation or solvent evaporation techniques.

The base salt of phenolic polymer can be conveniently prepared by reaction between a base and a phenolic prepolymer. As noted above, bases for use in the preparation of the base salt may vary widely and may include both inorganic and organic bases. Illustrative of suitable bases are tertiary amines, alkali metal hydroxides, and alkali metal carbonates.

Preferred for use in the product of this invention are alkali metal hydroxides such as sodium hydroxide and potassium hydroxide, and tertiary amines such as triethyl amine, trimethyl amine and pyridine, with triethyl amine most preferred.

Useful phenolic resin include phenol formaldehyde resin, substituted phenol formaldehyde resin, resole, lignin modified phenolic resin, cashew nut shell phenol formaldehyde resin, phenol furfuraldehyde resin, and p-xylene phenolic resin.

The phenolic cyanate polymer of this invention, completely cured, incompletely cured and partially-cured compositions of this invention are useful in forming a wide variety of industrial products, including shaped articles, as produced by known shaping processes. The phenolic cyanate polymer of this invention compositions can be formed (i.e., shaped) into articles which can then be cured to form completely cured, incompletely cured and partially-cured articles. Shaped articles produced from the polymer composition include windscreens such as wind shields, structural parts, canopies, door windows, wire housing and the like. The shaping process can be any process known to one skilled in the art, such as injection, blow or extrusion molding. Another use of the crosslinked polymer of the member is a bind agent in the manufacture of friction materials such as brake linings, clutch facings and transmission bands, as for example those described in U.S. Pat. Nos. 3,966,670; 4,268,657; or 4,281,361. Still other uses of the copolymers of this invention are molding materials, composites for use in the manufacture of structural parts. Yet other copolymers of this invention are useful as adhesives.

In order that those skilled in the art will be better able to practice the invention, the following examples are given by way of illustration and not by way of limitation. In the examples, all parts are by weight unless otherwise noted.

EXAMPLE 1

A. Preparation of the Phenolic Cyanate

A mixture of 1.81 kg of novolac (phenol formaldehyde resin) (613 number average molecular weight), and 1.79 kg triethylamine was dissolved in 7L of tetrahydrofuran at ambient temperature. Cyanogen bromide (2.04 kg) was dissolved in 6L of tetrahydrofuran under nitrogen atmosphere. The solution containing the trialkylammonium salt of novolac was added to cyanogen bromide solution over a period of 3–4 hrs. During the addition, the temperature of the reaction mixture was maintained at $-20°$ C. to $-15°$ C. After the reaction was completed, the reaction was allowed to continue for an additional 16–18 hrs. at room temperature. The product was isolated by filtration to remove trialkylamine salt. The filtrate was purified by precipitation in 26L of cold isopropanol/dry ice mixture ($-15°$ C. to $-20°$ C.) (twice), and subsequently dried in a vacuum oven overnight to produce off-white phenolic-cyanate. The elemental analysis indicated % C=72.25, % H=3.42, and % N=10.22. The IR spectrum indicated strong absorption at $-C{\equiv}N(2250\ cm^{-1})$ and the absence of any carbamate and dicyanamide functions.

B. Preparation of a Phenolic Triazine/Phenolic Cyanate Copolymer

A 50 g sample of phenolic-cyanate of Step A was heated in a test tube for about 20 min. at 100° C. to form a yellowish white meltable phenolic cyanate-phenolic triazine copolymer. The IR spectrum indicated the presence of cyanate functions (2250 cm$^{-1}$) and triazine functions (1580 cm$^{-1}$ and 1380 cm$^{-1}$). The copolymer was soluble in tetrahydrofuran, methylene chloride, acetone, and methyl ethyl ketone. The Elemental analysis was, % C 72.25, % H 3.42, % N 10.22. The IR spectrum indicated about 15 to about 20 mole % triazine based on the total moles of phenyl groups in the copolymer.

EXAMPLE 2

A. Formation of the Phenolic-Cyanate

A mixture of 50 g of novolac (570 number average molecular weight) and 51.0 g of triethylamine was dissolved in 160 g of tetrahydrofuran at ambient temperature. A 57.7 g sample of cyanogen bromide was dissolved in 135 g of tetrahydrofuran under nitrogen atmosphere. The solution of the trialkylammonium salt of the novolac was added to the cyanogen bromide solution over a period of 1 hr. During the addition of the solution, the temperature of the reaction mixture was maintained at about $-10°$ to $-15°$ C. After the addition was completed, the reaction was allowed to continue for an additional 1 hour period at room temperature. The product was isolated from the trialkyl ammonium bromide salt by-product by filtration. The product was purified by precipitation in isopropanol/dry ice mixture ($-15°$ C. to $-20°$ C.) and subsequently dried in a vacuum oven overnight to produce off-white phenoliccyanate.

The structure of the product was confirmed by IR spectrum which showed the presence of cyanate functions ($-C{\equiv}N$, 2200–2300) and the absence of carbamate functions ($-NH-$ and $=NH$ 3330 cm$^{-1}$).

B. Preparation of the Phenolic Cyanate/Phenolic Triazine Copolymer

A 10 g sample of phenolic-cyanate of Step A was heated in a test tube about 30 min. at 100° C. to form a yellowish polymer. The IR spectrum indicated the presence of 60 to 65 mole % cyanate (2250 cm$^{-1}$), 15 to 20 mole % triazine (1580 cm$^{-1}$, and 1380 cm$^{-1}$) and about 10 mole % phenolic hydroxyl (3400 cm$^{-1}$).

The elemental analysis was % C=72.0, % H=4.61, and % N=9.55. The copolymer was soluble in organic solvents like tetrahydrofuran, methylene chloride and methyl ethyl ketone.

EXAMPLE 3

A. Preparation of the Phenolic Cyanate

A mixture of 75.8 g of cyanogen bromide was dissolved in 75 g tetrahydrofuran A 61.2 g sample of high ortho content novolac of number average molecular weight 620 was dissolved in 100 g of tetrahydrofuran and 66.7 g of triethylamine was added gradually to form trialkylammonium salt of novolac. The trialkylammonium salt of novolac solution was added to the cyanogen bromide solution gradually during the time of addition the temperature of the reaction mixture was maintained at about $-20°$ to $-10°$ C. After the addition was completed, the reaction was allowed to continue for 18 hrs. at room temperature. The product was isolated from trialkylammonium bromide salt by-product by filtration.

The isolated solution was added gradually to isopropanol/dry ice mixture ($-15°$ C. to $-20°$ C.). A white precipitate was formed. The product was redissolved in tetrahydrofuran and repreciptate in isopropanol. The IR spectrum was consistent with the proposed structure and showed the absence of carbamate functions

EXAMPLE 4

A. Preparation of the Phenolic Cyanate

A sample of 315 g of cyanogen bromide was dissolved in 500 g of tetrahydrofuran. A 288 g sample of novolac (320 number average molecular weight) was dissolved in 700 g of tetrahydrofuran, and 286 g of triethylamine was added gradually to form the trialkyammonium salt of the novolac. The solution of the trialkylammonium salt of novolac was added to the cyanogen bromide solution gradually. During the addition, the temperature of the reaction mixture was maintained at about −20° to −15° C. After the addition was completed, the reaction was allowed to continue for 20 hrs. at room temperature The product was isolated from trialkylammonium bromide salt by-product by filtration.

The isolated solution was added gradually to isopropanol, forming a white gum. The gum was redissolved in tetrahydrofuran and reprecipitate in isopropanol. The resulting gum was redissolved in tetrahydrofuran, and the tetrahydrofuran solution was concentrated with a rotary evaporator. A light yellow viscous liquid formed. The IR spectrum was consistent with the proposed structure and showed the absence of carbamate functions.

B. Preparation of the Phenolic Triazine/Phenolic Cyanate Copolymer Copolymer A 100 g sample of viscous liquid phenolic-cyanate of Step A was heated 1½ hrs. under nitrogen to form a solid product. The IR spectrum indicated the formation of about 20 mole % linear triazine ring. The product was soluble in acetone, methyl ethyl ketone and $CH_2Cl_2$.

EXAMPLE 5

Preparation of the Phenolic Cyanate/Phenolic Triazine Copolymer

A 5 g sample of the phenolic cyanate from Step A of Example 1 was heated 5 min. at 125° C. to form phenolic cyanate-triazine copolymer. IR spectrum indicate about 10 mole % triazine formation. The copolymer is soluble in organic solvents

EXAMPLE 6

A mixture of 6.5 g of novolac (570 number average molecular weight) and 3.3 g of triethylamine was dissolved in 30 ml of diglyme at ambient temperature. A 3.5 g sample of cyanogen bromide solution was dissolved in 20 ml of diglyme under nitrogen atmosphere. The solution containing the trialkylammonium salt of novolac was added to cyanogen bromide over a period of 20 minutes. During the solution addition, the temperature of the reaction mixture was maintained at about −10° C. After the addition was completed, the reaction was allowed to continue for an additional 1 hour period at room temperature. The product was isolated from trialkylammonium salt by filtration and the resulting filtrate was purified by precipitation in isopropanol/dry ice mixture at −5° C. and subsequently vacuum dried to obtain a white product. The structure of product was confirmed by IR spectrum.

EXAMPLE 7

Formation of the Phenolic-Cyanate

A mixture of 50 g of novolac (570 number average molecular weight) and 51.0 g of triethylamine was dissolved in 160 g of tetrahydrofuran at ambient temperature. A 57.7 g sample of cyanogen bromide was dissolved in 135 g of tetrahydrofuran under nitrogen atmosphere. The solution of the trialkylammonium salt of the novolac was added to the cyanogen bromide solution over a period of 1 hr. During the addition of the solution, the temperature of the reaction mixture was maintained at about −10° to −15° C. After the addition was completed, the reaction was allowed to continue for an additional 1 hour period at room temperature. The product was isolated from the trialkyl ammonium bromide salt by-product by filtration. The product was purified by precipitation in isopropanol at room temperature and a white gum formed. The white gum was difficult to solidify. Analysis by GC indicated about 2–5% carbamate, and about 1–2% dicyanamide.

EXAMPLE 8

A. Formation of the Phenolic-Cyanate

A mixture of 50 g of novolac (570 number average molecular weight) and 51.0 g of triethylamine was dissolved in 160 g of tetrahydrofuran at ambient temperature. A 57.7 g sample of cyanogen bromide was dissolved in 135 g of tetrahydrofuran under nitrogen atmosphere. The solution of the trialkylammonium salt of the novolac was added to the cyanogen bromide solution over a period of 1 hr. During the addition of the solution, the temperature of the reaction mixture was maintained at about 20° C. After the addition was completed, the reaction was allowed to continue for an additional 1 hour period at room temperature. The product was isolated from the trialkyl ammonium bromide salt by-product by filtration. The product was purified by precipitation in isopropanol/dry ice mixture (−15° C. to −20° C.) and subsequently dried in a vacuum oven overnight to produce off-white phenolic-cyanate.

The structure of the product was confirmed by IR spectrum which showed the presence of cyanate functions (—C≡N, 2200–2300). The presence of about 2 to 3% dicyanamide was determined by GC.

EXAMPLE 9

A. Preparation of the Phenolic Cyanate

A mixture of 1.81 kg of novolac (613 number average molecular weight), and 1.91 kg triethylamine was dissolved in 7L of tetrahydrofuran at ambient temperature. Cyanogen bromide (2.16 kg) was dissolved in 6L of tetrahydrofuran under nitrogen atmosphere. The solution containing the trialkylammonium salt of novolac was added to cyanogen bromide solution over a period of 3–4 hrs. During the addition, the temperature of the reaction mixture was maintained at −20° C. to −15° C. After the reaction was completed, the reaction was allowed to continue for an additional 16–18 hrs. at room temperature. The product was isolated by filtration to remove trialkylamine salt. The filtrate was purified by precipitation in 26L of isopropanol/dry ice mixture (−20° C.) (twice), and subsequently dried in a vacuum oven overnight to produce off-white phenolic-cyanate. The elemental analysis indicated % C=72.25, % H=3.42, and % N=10.22. The IR spectrum indicated strong absorption at —C≡N(2250 cm$^{-1}$) and the absence of any carbamate functions, and dicyanamide.

B. Preparation of the Phenolic Triazine/Phenolic Cyanate Copolymer

A 50 g sample of phenolic-cyanate of Step A was heated in a test tube for about 20 min. at 100° C. to form a yellowish white meltable phenolic cyanate-phenolic triazine copolymer. The IR spectrum indicated the presence of cyanate functions (2250 cm$^{-1}$)and triazine functions (1580 cm$^{-1}$ and 1380 cm$^{-1}$). The copolymer was soluble in tetrahydrofuran, methylene chloride, acetone, and methyl ethyl ketone. The Elemental analysis was, % C 72-25, % H 3,42, % N 10.22. The IR spectrum indicated about 15 to about 20 mole % triazine based on the total moles of phenyl groups in the copolymer.

COMPARATIVE EXPERIMENT A

(1) Preparation of the Phenolic Cyanate of Japanese Kokai No. 149918-1984.

To a 2 Liter beaker was added 384 g of novolac (550 number average molecular weight), 330.4 g of triethylamine and 768 g of methylene chloride. A highly viscous solution of the trialkyl ammonium salt of the novolac resulted. A 417.6 g sample of cyanogen bromide was added to 976 g methylene chloride in a 4 liter beaker, and the solution was cooled to 0° C. The trialkylammonium salt solution was added to the cyanogen bromide solution over a 45 min. period using an addition funnel while maintaining the temperature of the reaction exotherm at about 0° C. with a dry ice/isopropanol bath. The heterogeneous reaction mixture was then allowed to react for an additional 30 min., after which it was poured into 300 ml of deionized water with stirring. The methylene chloride layer was isolated and washed 2 times with 300 ml of deionized water. Upon concentration in a rotory evaporator, a semisolid product was obtained which upon drying under vacuum pump provided a solid product.

The analysis of the semisolid product by gas chromatograph indicated the presence of dicyanamide byproduct. IR spectrum of solid material indicated the presence of carbamate functions (about 10–15%) at 1740 cm$^{-1}$ and 3300 cm$^{-1}$.

(2) Preparation of the Phenolic Cyanate/Phenolic Triazine Copolymer From the Phenolic Cyanate Using the procedure of Example 1, the phenolic cyanate of step A was treated to form a phenolic cyanate/phenolic triazine copolymer.

IR spectrum indicate presence of about 15–20 mole % triazine formation. The polymer is soluble in organic solvents.

COMPARATIVE EXAMPLE B

(1) Preparation of the Phenolic Cyanate of U.S. Pat. No. 4,022,755

To a 2 liter beaker was added 100 g of novolac (380 number average molecular weight) and 500 ml methylethylketone. A yellow solution was observed in 10 minutes. The solution was cooled to 0° C., and 113 g of cyanogen bromide was added. A 99.8 g sample of triethylamine was added to the novolac-cyanogen bromide solution. The rate of addition was controlled to provide a temperature of from 5°–10° C. After the triethylamine addition, a heterogeneous reaction mixture was observed. The triethylammonium bromide salt by-product was filtered from the reaction mixture, and the filtrate was concentrated on a rotary evaporator under reduced pressure. The product obtained was insoluble in organic solvents and a gel was observed. The IR spectrum indicate formation of carbamate at 1740 cm$^{-1}$ and 3300 cm$^{-1}$. The GC analysis of reaction filtrate indicate the presence of about 5–7% dicyanamide.

(2) Preparation of the Phenolic Cyanate/Phenolic Triazine Copolymer

The above gel product of Step A was heated at about 125° C. to form phenolicyanate/phenolic triazine copolymer.

This product was moldable at 160° C., 300 psi.

COMPARATIVE EXAMPLE C

(1) Preparation of the Phenolic Cyanate of U.S. Pat. No. 4,022,755

To a mixture of 108 g (0.999 mole) of m-cresol and 65 g (0.801 mole as CH$_2$O) of formalin (37% CH$_2$O) were added 0.2 g of (0.0022 mole) oxalic acid and 0.1 g (0.0010 mole as HCl) of hydrochloric acid (35%). The mixture was heated at 99° C. to 100° C. to form an emulsion. The emulsion was refluxed for 4 hours and 30 minutes, and then dehydrated under reduced pressure to obtain a solid cresol novolac. The resulting cresol novolac had a melting point of 92°–103° C.

In 210 ml of acetone was dissolved 72 g (0.6 mole as —OH) of the m-cresol novolac. The resulting solution was cooled to 0° C. To the cooled solution was added 70 g (0.661 mole) of cyanogen bromide followed by dropwise addition of 64 g (0.632 mole) of triethylamine. After completion of the reaction, the triethylamine hydrobromide salt was removed. The resulting reaction mixture was added to vigorously stirred water. A semisolid product obtained which was dried 40° C. in a vacuum oven to 18 hrs. to obtain a solid powder having a melting point of 72°–78° C. IR spectrum revealed a strong absorption at 2250 cm$^{-1}$ which indicated formation of cyanate (about 80–85%). The spectrum also indicate 5 mole % carbamate formation and 10–15 mole % of unreacted hydroxyl groups.

A 50 g sample of the phenolic cyanate was molded in a 3"×3" mold at 155° C., 300 psi for 10 min. The materials squeeze out from the mold without forming representative sample for thermal (Tg) and mechanical measurements.

(2) Preparation of Phenolic Cyanate/Phenolic Cyanate Triazine Copolymer

A 20 g sample of m-cresol phenolic-cyanate (M.P. 72°–78° C.) was heated 80° C. for 20 min. to form a meltable phenolic cyanate-phenolic triazine copolymer which was soluble in organic solvents. IR spectrum analysis indicated that the copolymer included about 30 mole % linear triazine formation.

The above copolymer was molded in a 3"×3" mold at 155° C., 300 psi, for 10 min. to obtained a tough plague. During the time of molding, there was very little loss of material due to flashout.

COMPARATIVE EXAMPLE D

(1) Preparation of Phenolic Cyanate of U.S. Pat. No. 3,448,079

A 106 g sample of novolac (620 number average molecular weight) and which contains one OH group per 106 molecular weight was dissolved in 250 ml of acetone. The solution was cooled to 0° C. after which 128 g of cyanogenbromide was added. To the solution was then slowly added dropwise 145 ml of triethylamine. Cyanogen bromide (5 g) was then added to the reaction mixture during the course of the reaction to replace evaporation loses. The triethylaminehydrobromide salt produced by the reaction was removed by suction filtration, and the filtrate concentrated by evaporation to provide a solid powder. IR spectrum indicated cyanate formation and the presence of carbamate functions.

(2) Preparation of the Phenolic Triazine/Phenolic Cyanate Copolymer

A 50 g sample of phenolic cyanate of Step A was heated to 100° C. for 15 min. to form the phenolic triazine/phenolic cyanate copolymer having 5–10 mole % triazine. This material was molded at 155° C. for 6 min to provide a plague. The plague was postcured for about 4 hrs. before any thermal and mechanical properties measurements were obtained.

COMPARATIVE EXAMPLE E

A series of experiments were carried out for the purpose of evaluating the thermal characteristics of certain embodiments of this invention whose preparation is described in Examples 1(A), 1(B), 2(A), and 4(A) and to compare same to the thermal characteristics of the materials of Comparative Examples A(1), B(1), C(1) and D(1) and to the thermal characteristics of a base phenolic resin. The thermal characteristics were chosen for comparative purposes because these characteristics impact significantly on the use of these materials in high temperature applications. In these experiments, thermogravimentric analysis (TGA) was carried out in an argon atmosphere to determine the weight loss of a sample as a function of temperature and the % Char at 1000° C. These experiments were carried out using a Dupont-1090 thermogravimeter at a heating rate of 10° C./min. The typical size sample was 30–40 mg. The results of these experiments are set forth in the following TABLE I.

ples B(1), C(1), C(2), D(1) and D(2). In these experiments, the glass transition temperature was determined on molded articles. Molding was carried out for 6 minutes at 55° C. followed by post curing for 4 hours at 22° C. The glass transition temperature was determined on a 4 cm × 1 cm plagues by dynamic mechanical analysis (DMA) where the upper limit was 300° C. The results of the test are set forth in the following Table II.

TABLE II

| Exp. No. | Sample | Tg (°C.) |
|---|---|---|
| (1) | Ex. 1 (A) | >280 |
| (2) | Ex. 2 (B) | >300 |
| (3) | Ex. 3 (A) | >300 |
| (4) | Ex. 3 (B) | >300 |
| (5) | Ex. 9 (B) | >300 |
| (6)* | Ex. B (1) | 68 |
| (7) | Ex. C (1) | 250 |
| (8) | Ex. C (2) | 280 |
| (9) | Ex. D (1) | 225 |
| (10) | Ex. D (2) | 250 |

*The sample did not cure properly, and formed blisters.

COMPARATIVE EXAMPLE G

Using molded plagues formed as described in COMPARATIVE EXAMPLE F, a series of experiments were carried out for the purpose of evaluating the flexural modulus and flexural strength of cured compositions of this invention formed from the compositions of this invention whose preparation are described in Examples 1(A) and 1(B), and to compare same to the flexural strength and tensile strength of cured compositions

TABLE I

| Exp. No. | Sample | % Weight Loss at °C. | | | | | | | | | % Char at 1000° C. |
|---|---|---|---|---|---|---|---|---|---|---|---|
| | | 200° C. | 300° C. | 400° C. | 450° C. | 500° C. | 600° C. | 700° C. | 800° C. | 900° C. | |
| 1. | Novolac | 0 | 0 | 4 | 25 | 39 | — | 58 | — | 55 | 45 |
| 2. | Ex. 1 (B) | 0 | 0 | 0 | 1.2 | 14 | 24 | 30 | 32 | 33 | 66 |
| 3. | Ex. 1 (B) | 0 | 0 | 0 | 0 | 12.5 | 25 | 32 | 31 | 35 | 65.3 |
| 4. | Ex. 2 (B) | 3 | 3 | 3 | 6 | 13 | 24 | 32 | 34 | 35 | 65 |
| 5. | Ex. 4 (B) | 0 | 0 | 0 | 2.5 | 16 | 25 | 31 | 33 | 35 | 65 |
| 6. | Ex. A (1) | 13 | 14 | 15 | 20 | 26 | 34 | 40 | 42 | 43 | 55 |
| 7. | Ex. B (1) | 15 | 16 | 17 | 18 | 24 | 35 | 38 | 42 | 41 | 56 |
| 8. | Ex. C (1) | 15 | 15.5 | 16 | 34 | 38 | 46 | 48 | 51 | 53 | 46 |
| 9. | Ex. D (1) | 3.5 | 4.5 | 10 | 20 | 30 | 39 | 46 | 48 | 47 | 53 |
| 10. | Ex. D (2) | 2.0 | 3.5 | 8 | 17 | 21 | 35 | 44 | 46.5 | 47 | 56 |
| 11. | 9 (A) | 2.4 | 3 | 3 | 15 | 20 | 29 | 35 | 38 | — | 59.64 |
| 12. | 9 (B) | 0 | 0 | 0 | 1.2 | 10 | 22 | 25 | 32 | — | 62.19 |

COMPARATIVE EXAMPLE F

A series of experiments were carried out for the purpose of evaluating the glass transition (Tg) of cured compositions of this invention whose preparation are described in Examples 1(A), 1(B), 3(A) and 3(B) and to compare same to the glass transition temperature of the cured compositions formed from the compositions whose preparation are described in Comparative Examples B(1), C(1), C(2), D(1) and D(2). In these experiments, the flexural strength and the flexural modulus were determined using an Instrum Machine with standard test methods, ASTM D790. The results of these experiments are set forth in the following Table III.

TABLE III

| Exp. No. | Sample | Flexural Strength (psi) | Flexural Modulus (psi) |
|---|---|---|---|
| 1 | Ex. 1 (B) | — | — |
| 2 | Ex. 2 (B) | 9785 (687.9 kg/cm$^2$) | .69 × 10$^6$ (0.48 × 10$^5$ kg/cm$^2$) |
| 3 | Ex. 9 (B) | 10,937 (768.94 | .61 × 10$^6$ (0.42 × 10$^5$ kg/cm$^2$) |

TABLE III-continued

| Exp. No. | Sample | Flexural Strength (psi) kg/cm² | Flexural Modulus (psi) |
|---|---|---|---|
| 4 | Ex. 3 (B) | — | — |
| 5 | Ex. C (2) | 6275 (441.1 kg/cm²) | .67 × 10⁶ (0.47 × 10⁵ kg/cm²) |
| 6 | Ex. D (1) | — | — |
| 7 | Ex. D (2) | 8200 (576.5 kg/cm²) | .68 × 10⁶ (0.47 × 10⁵ kg/cm²) |

COMPARATIVE EXAMPLE H

A series of experiments were carried out for the purpose of evaluating the shelf life of each of the compositions of this invention whose preparations are described in Examples 1, 2 and 4 and to compare same to the shelf life of each of the compositions whose preparations are described in Comparative Examples A(1), B(1), C(1) and D(1). In these experiments, the shelf of the composition was determined by storing same at room temperature to determine the number of days necessary for the formation of materials which were insoluble in several organic solvents. The results of these studies are set forth in the following Table IV.

TABLE IV

| Exp. No. | Solvent | Ex 1 (A) | Ex 2 (B) | Ex 2 (A) | Ex 4 (A) | Ex (7) | Ex (8) | A (1) | B (1) | C (1) | D (1) |
|---|---|---|---|---|---|---|---|---|---|---|---|
| (1) | Tetrahydrofuran | S (90) | S (90) | S (>90) | S (>90) | S (2) | S (3) | S (3) | I (0) | S (2) | S (1) |
| (2) | Methylene Chloride | S (90) | S (90) | S (>90) | S (>90) | I | I | I (0) | I (0) | I (0) | I (0) |
| (3) | Methyl Ethyl Ketone | S (90) | S (90) | S (>90) | S (>90) | S (2) | S (3) | S (3) | I (0) | I (0) | S (1) |

In this table, the following abbreviations are used;
(a) "S" is soluble and
(b) "I" is insoluble.

The number in the parenthesis is the number of days on the shelf before becoming insoluble.

EXAMPLE 10

Preparation of the Phenolic Cyanate Resin

A mixture of 204 g of novolac (613 number average molecular weight) and 212 g triethylamine was dissolved in one liter of tetrahydrofuran at ambient temperature to form a triethyl ammonium salt of novolac. A 240 g sample of cyanogen bromide was dissolved in one liter of tetrahydrofuran under nitrogen atmosphere. The solution containing the triethylammonium salt of novolac was added to cyanogen bromide solution with a average addition rate 7–8 ml/min. During the addition, the temperature of the reaction mixture was maintained at −20° to −30° C. After the reaction was completed, the reaction mixture was stirred for additional one hour and the temperature of reaction mixture rose to +10° C. The product was isolated by filtration to remove triethylammonium salt. The filtrate was purified by precipitation in a cold isopropanol/dry ice mixture (−15° C. to −20° C.) (twice), and subsequently dried in a vacuum over overnight to produce an off white phenolic cyanate resin. Elemental analysis indicated: wt. % C=73.5(73wt. %), wt %. of H=4.0(3.82) and wt. % of N=10.6(10.7). The numbers in parenthesis are theoretical, based on the empirical formula $C_8H_5NO$ for a cyanato group containing phenolic resin where R is H. The IR Spectrum indicated absorption at $-C\equiv N$ (22.50(m$^{-1}$) and absence of any carbamate. Gas chromatograph analysis showed absence of diethyl cyanamide

EXAMPLE 11

Example 10 was repeated except that the novolac used had a 980 number average molecular weight. The triethylammonium salt of novolac was added to the cyanogen bromide solution over a period of three hours with an average addition rate of 7–8 ml/min. The reaction mixture was maintained at −30° C. Otherwise the conditions of Example 11 were identical to that of Example 10.

EXAMPLE 12

Example 10 was again repeated except that a mixture of 50 grams of novolac (613 number average molecular weight) and 51.0 grams of triethylamine was dissolved in 160 grams of tetrahydrofuran at ambient temperature to form the triethyl ammonium salt. 57.7 grams of cyanogen bromide was dissolved in 135 grams of tetrahydrofuran under nitrogen atmosphere. The solution containing the triethylammonium salt of novolac was added to cyanogen bromide solution over a period of one hour. During the addition the temperature of the reaction mixture was maintained at from −10° to −15° C. The procedure of Example 10 was then followed.

COMPARATIVE I

Example 12 was repeated except that a mixture of 50 grams of novolac (613 number average molecular weight) and 51.0 grams of triethylamine was dissolved in 80 grams of tetrahydrofuran at ambient temperature to form the triethylammonium salt. 57.7 grams of cyanogen bromide was dissolved in 135 grams of tetrahydrofuran under nitrogen atmosphere. The procedure of Example 12 was followed.

COMPARATIVES FROM PATENTS

Example 1 of U.S. Pat. No. 3,448,079 and Examples 1, 3 and 4 of U.S. Pat. No. 4,022,755 were repeated.

SAMPLE TESTING

Measurements were made to determine the gel time of the cyanato containing phenolic resins produced by Example 10 through 12 of the present invention as well as the comparative examples. The samples were tested for gel time using the following procedure:

Apparatus

Stop watch
0°-250° C. thermometer
Electric hot plate, adjusted to 155±1° C. and enclosed in a wind shield.
4" spatula

Method

1. For powdered resins: Weigh out a 1.0 gram sample on a watch glass.
2. Quickly dump the complete sample on the center surface of the hot plate and at the same time start the stop watch.
3. Using a 4" spatula spread the resin over a 2 inch square area in the center of the hot plate and stroke the entire area with the spatula at a rate approximating 80 strokes per minute. Without stopping the watch, not the time it took for the resin to melt.
4. Continue stroking, keeping the blake of the spatula close to the surface of the resin, until the resin has passed through a stringy stage and suddenly seems hard and glazed and offers little or no resistance to stroking with the spatula. This end point is best determined only after considerable practice to get the "feel" of the resin as it "lets go" at its gel point.
5. Record number of seconds to melt and number of seconds for gel time (cure time). Subsequent checks on the same sample should agree within ±5 seconds.

Smoke generation was a visual observation during testing of gel time. The percent diethyl cyanamide was measured by Gel Permeation Chromatography (GC). The results are summarized in Table V:

TABLE V

| Example | Gel Time (min) | Smoke | Diethyl Cyanamide wt % by GC |
|---|---|---|---|
| Example 10 | 20-30 | No | None |
| Example 11 | 8-10 | No | None |
| Example 12 | 2-3 | No | None |
| U.S. Pat. No. Ex. 1 (3,448,079) | Instant- no clear melting point | Smoke | 8 |
| U.S. Pat. No. Ex. 1 (4,022,755) | 8 Min. | Heavy Smoke | 5-7 |
| U.S. Pat. No. Ex. 3 (4,022,755) | 5.5-6 Min | Mild Smoke | 4.25 |
| U.S. Pat. No. Ex. 4 (4,022,755) | 15 Min. | Heavy Smoke | — |

The effect of the triethylammonium salt concentration on gel time was also reviewed. The concentration of triethylammonium salt is *calculated* based on the quantities of novolac resin, triethyl amine and THF. The results are summarized in Table VI.

TABLE VI
Effect of Salt Concentration on Gel time

| Example | Salt concentration wt (%) | Gel time (min) |
|---|---|---|
| Ex. 10 | 15 | 20-30 |
| Ex. 12 | 20 | 2-3 |
| Comp. I | 40 | Product gelled in reactor |

Thermal properties were measured according to thermal gravimetric analysis (TGA) and dynamic mechanical analysis (DMA). TGA was conducted in an argon atmosphere to determine the weight loss of a sample as a function of temperature. About a 30 milligram sample was heated at a 10° C./min. and weight loss measured. The sample was heated up to 900° C. in argon and the residue remaining at 900° C. is considered to be clean. Glass transition temperature was determined on a 4 cm × 1 cm × 0.3 cm thick plaque by Dynamic Mechanical Analysis. The sample was heated at a rate of 3° C. per minute and the frequency was 1 hertz. Results are summarized in Table 3.

TABLE VII

| Example | Polymer Decomposition Temperature, °C. (TGA) | % Char at 900° C. | Tg °C. (DMA) |
|---|---|---|---|
| Example 10 | 450 | 67 | >300 |
| Example 11 | 470 | 69 | >300 |
| Example 12 | 450-400 | 65-67 | — |
| U.S. Pat. No. Ex. 1 (3,448,079) | 300-400 | 47 | — |
| U.S. Pat. No. Ex. 1 (4,022,755) | 420-430' | 56 | — |
| U.S. Pat. No. Ex. 3 (4,022,755) | 420-430' | 53 | — |

'lost 16% by weight below 400° C. (believed to be from low molecular weight impurities)

While examplary embodiments of the invention have been described, the true scope of the invention is to be determined from the following claims:

What is claimed is:

1. A phenolic cyanato resin of the formula:

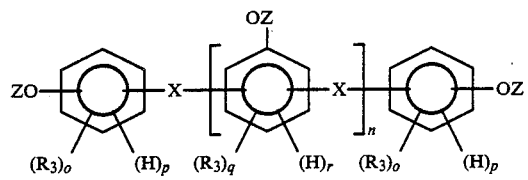

wherein:
q and r are the same or different and are whole numbers from 0 to 3 with the proviso that the sum of q and r at each occurrence is equal to 3;
Z is —CN, or hydrogen and —CN;
o and p are the same or different at each occurrence and are positive whole numbers from 0 to 4, with the proviso that the sum of o and p is equal to 4;
—X— is a divalent organic radical;
$R_3$ is the same or different at each occurrence and is a substituent other than hydrogen which is unreactive under conditions necessary to crosslink cyanurate moieties; and
n is a positive whole number,
the resin having substantially no smoke generation during gel time measurement at 155° C.

2. The resin according to claim 1 having a gel time of greater than 1 minute at 155° C.

3. The resin according to claim 2 wherein the gel time is greater than 2 minutes.

4. The resin according to claim 3 wherein the gel time is greater than 10 minutes.

5. A phenolic triazine resin derived from the cyanato group containing phenolic resin recited in claim 1.

6. A resin according to claim 1 wherein Z is hydrogen and —CN and from about 20 to about 100 mole percent of Z are —CN.

7. A resin according to claim 2 wherein from about 35 to about 80 mole percent of Z are —CN.

8. A resin according to claim 1 wherein X is substituted or unsubstituted methylene or 1,4-phenyldimethylene, wherein permissible substituents are alkyl groups having from 1 to about 10 carbon atoms, halogen, and furyl.

9. A resin according to claim 1 wherein —X— is methylene or methylene substituted with furfuryl, alkyl having from 1 to about 10 carbon atoms or halogen, or is a moiety of the formula

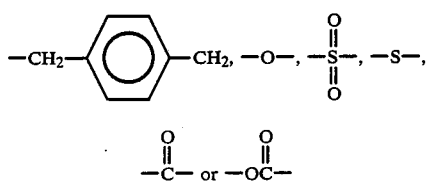

10. A resin according to claim 1 wherein n is from 1 to about 10.

11. A resin according to claim 10 wherein n is from about 6 to about 10.

12. A resin according to claim 10 wherein n is from about 6 to about 8.

13. A resin according to claim 10 wherein n is from 1 to about 5.

14. A resin according to claim 1 wherein:
o is 0 or 1; and
p is 2 to 4.

15. A resin according to claim 14 wherein:
o is 0; and
p is 4.

16. A resin according to claim 1 wherein:
q is 0 or 1; and
r is 2 to 3.

17. A resin according to claim 16 wherein:
q is 0; and
r is 3.

18. A resin according to claim 1 wherein $R_3$ is alkyl.

19. A resin according to claim 18 wherein $R_3$ is methyl or ethyl.

20. A resin according to claim 1 wherein:
o is 0,
q is 0; and
X is methylene.

21. A precured composition comprising a phenolic resin of the formula:

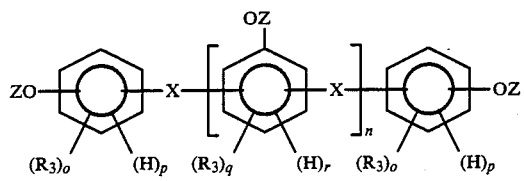

and optionally one or more fibrous or particulate fillers wherein:

q and r are the same or different and are whole numbers from 0 to 3 with the proviso that the sum of q and r at each occurrence is equal to 3;

Z is —CN, or hydrogen and —CN;

X is a divalent organic radical;

o and p are the same or different at each occurrence and are positive whole numbers from 0 to 4, with the proviso that the sum of o and p at each occurrence is equal to 4;

$R_3$ is the same or different at each occurrence and is substituent other than hydrogen which is unreactive under conditions necessary to crosslink cyanurate moieties; and n is a positive whole number, wherein the mole percent of phenyl groups substituted with carbamate functions is less than about 5 mole percent based on the total moles of phenyl groups in said resin.

22. A completely cured composition formed by cyclotrimerization of the composition of claim 21.

23. A partially cured composition formed by cyclotrimerization of the composition of claim 21.

24. An incompletely cured composition formed by cyclotrimerization of the composition of claim 21.

25. A completely cured composition formed by cyclotrimerization of the composition of claim 1.

26. An incompletely cured composition formed by cyclotrimerization of the composition of claim 1.

27. A partially cured composition formed by cyclotrimerization of the composition of claim 1.

28. A resin according to claim 21 containing one or more fibrous fillers.

29. A resin according to claim 1 containing one or more fillers.

30. A resin according to claim 21 wherein X is substituted or unsubstituted methylene or 1,4-phenyldimethylene, wherein permissible substituents are alkyl having from 1 to about 10 carbon atoms, halogen and furyl.

31. A resin according to claim 30 wherein X is methylene or methylene substituted with furfuryl, alkyl having from 1 to about 10 carbon atoms or halogen or is a moiety of the formula 32. A resin according to claim 21 wherein n is from 6 to about 10.

33. A resin according to claim 21 wherein n is from 1 to 5.

34. A resin according to claim 21 wherein $R_3$ is alkyl.

35. A resin according to claim 34 wherein $R_3$ is methyl or ethyl.

36. A resin according to claim 21 wherein:
q and o are the same or different and are 0 or 1;
p is 2 about to about 4; and
r is about 2 to about 3.

37. A resin according to claim 36 wherein:
q and o are 0;
p is 4; and r is 3.

38. A phenolic resin of the formula:

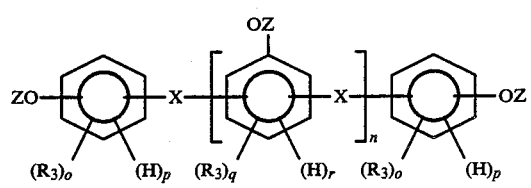

wherein:
n is a positive whole number;
q and r are the same or different and are whole numbers from 0 to 3 with the proviso that the sum of q and r at each occurrence is equal to 3;
Z is —CN, or hydrogen and —CN;
o and p are the same or different at each occurrence and are positive whole numbers from 0 to 4, with the proviso that the sum of o and p is equal to 4;
—X— is a divalent organic radical;
$R_3$ is the same or different at each occurrence and is substituent other than hydrogen which is unreactive under conditions necessary to crosslink cyanurate moieties; and
the resin having a residual amount of cyanamide of less than about 5 percent by weight based on the total weight of the resin.

39. A phenolic triazine resin derived from the cyanato group containing phenolic resin recited in claim 38.

40. A modified phenolic resin of the formula:

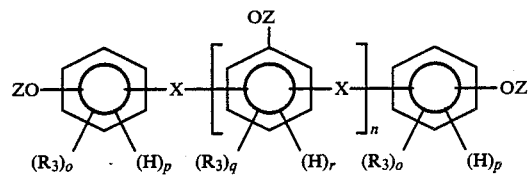

wherein:
q and r are the same or different and are whole numbers from 0 to 3 with the proviso that the sum of q and r at each occurrence is equal to 3;
Z is —CN, or hydrogen and —CN;
o and p are the same or different at each occurrence and are positive whole numbers from 0 to 4, with the proviso that the sum of o and p is equal to 4;
—X— is a divalent organic radical;
$R_3$ is the same or different at each occurrence and is a substituent other than hydrogen which is unreactive under conditions necessary to crosslink cyanurate moieties; and
n is a positive whole number, the resin having a residual amount of substituted or unsubstituted phenyl cyanate of less than about 2% by weight based on the total weight of the resin.

41. A phenolic triazine resin derived from the cyanato group containing phenolic resin recited in claim 40.

42. A phenolic triazine resin derived from a cyanato group containing phenolic resin of the formula

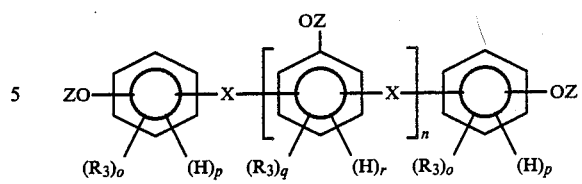

wherein:
q and r are the same or different and are whole numbers from 0 to 3 with the proviso that the sum of q and r at each occurrence is equal to 3;
Z is —CN, or hydrogen and —CN;
o and p are the same or different at each occurrence and are positive whole numbers from 0 to 4, with the proviso that the sum of o and p is equal to 4;
—X— is a divalent organic radical;
$R_3$ is the same or different at each occurrence and is a substituent other than hydrogen which is unreactive under conditions necessary to crosslink cyanurate moieties; and
n is a positive whole number,
the phenolic resin having substantially no smoke generation during gel time measurement at 155° C., and the phenolic triazine resin having a thermal stability of at least 400° C. as measured by thermal gravimetric analysis.

43. The phenolic triazine resin as recited in claim 42 having a char yield of at least 50% by weight at 900° C.

44. The resin according to claim 1 having less than about 0.5% by weight of phenyl cyanato.

45. The resin according to claim 1 having a number average molecular weight of from about 320 to about 1500.

46. The resin according to claim 1 having a number average molecular weight of from about 500 to about 1000.

47. A phenolic cyanato resin of the formula:

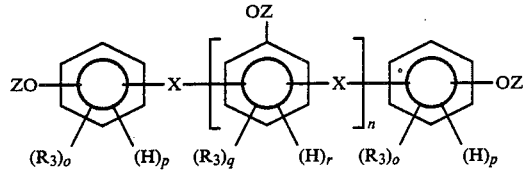

wherein:
Z is —CN or hydrogen and —CN;
n is a positive whole number;
q and r are the same or different at each occurrence and are whole numbers from 0 to 3 with the proviso that the sum of q and r at each occurrence is equal to 3;
o and p are the same or different at each occurrence and are positive whole numbers from 0 to 4, with the proviso that the sum of o and p is equal to 4;
—X— is a divalent organic radical; and
$R_3$ is the same or different at each occurrence and is a substituent other than hydrogen which is unreactive under conditions necessary to crosslink cyanurate moieties.
wherein a completely cured product of said resin exhibits a weight loss of less than about 10% by weight of the product on heating said product from a temperature of 20° C. to a temperature of 400° C. at a rate of 10° C./min under an argon atmosphere.

48. A resin according to claim 47 wherein said weight loss is equal to or greater than about 3 wt %.

49. A resin according to claim 47 wherein said resin has substantially no smoke generation during gel time measurements at 155° C.

50. A resin according to claim 47 wherein said completely cured product of said resin exhibits a weight loss of less than about 18 wt % based on the total weight of the completely cured product on heating said product from a temperature of from about 20° C. to a temperature of 450° C. at a rate of 10° C./min under an argon atmosphere.

51. A resin according to claim 47 wherein said completely cured product of said copolymer exhibits a % char at 1000° C. equal to or greater than about 59% based on the total weight of said product on heating said product from a temperature of from about 20° C. to a temperature of 1000° C. at a rate of 10° C./min under an argon atmosphere.

52. A resin according to claim 47 wherein a completely cured product of said resin exhibits a glass transition temperature of greater than about 280° C. as determined on a 4 cm by 1 cm plaque formed of said product using dynamic mechanical analysis.

53. A resin according to claim 52 wherein said glass transition temperature is equal to or greater than about 300° C.

54. A resin according to claim 47 wherein the mole % of phenyl groups substituted with carbamate functions is less than about 5 mole %.

55. A resin according to claim 54 wherein the mole % of phenyl groups substituted with carbamate functions is less than about 2 mole %.

56. A resin according to claim 55 where none or substantially none of the phenyl groups are substituted with carbamate functions.

57. A resin according to claim 47 which comprises less than about 5 wt % dicayanamide.

58. A resin according to claim 57 which comprises less than 2 wt % dicyanamide.

59. A resin according to claim 58 which comprises less than about 1 wt % dicyanamide.

60. A resin according to claim 59 which comprises no dicyanamide or substantially no dicyanamide.

61. A composition comprising a phenolic resin according to claim 47 and one or more fibrous or particulate fillers.

62. A completely cured composition formed by cyclotrimerization of the resin of claim 47.

63. A partially cured composition formed by cyclotrimerization of the resin of claim 47.

64. An incompletely cured composition formed by cyclotrimerization of the resin of claim 47.

65. A resin according to claim 47 wherein Z is hydrogen and —OCN and from about 50 to about 100 mole percent of Z are —OCN based on the total moles of —OCN and —OH groups.

66. A resin according to claim 65 wherein from about 50 to about 100 mole percent of Z is —OCN.

67. A resin according to claim 66 wherein from about 70 to about 100 mole percent of Z is —OCN.

68. A resin according to claim 67 wherein from about 70 to about 80 mole percent of Z is —OCN.

69. A resin according to claim 67 wherein from about 80 to about 95 mole percent of Z is —OCN.

70. A resin according to claim 47 wherein X is substituted or unsubstituted methylene or 1,4-phenyldimethylene, wherein permissible substituents are alkyl groups having from 1 to about 10 carbon atoms, halogen, and furyl.

71. A resin according to claim 47 wherein X is methylene or methylene substituted with furfuryl, alkyl having from 1 to about 10 carbon atoms or halogen or is a moiety of the formula

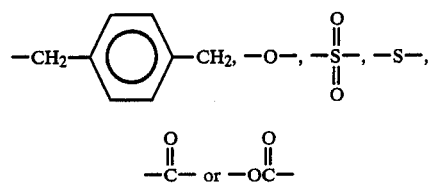

72. A resin according to claim 47 wherein n is from 1 to about 10.

73. A resin according to claim 47 wherein:
o is 1; and
p is 2 to 4.

74. A resin according to claim 47 wherein:
q is 0 or 1; and
r is 2 to 3.

75. A resin according to claim 47 wherein R₃ is alkyl.

76. A phenolic cyanato resin of the formula:

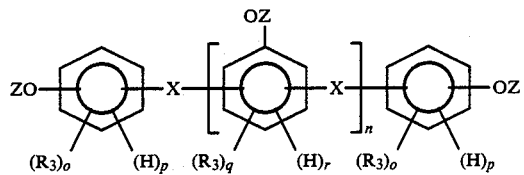

wherein:
Z is —CN or hydrogen and —CN;
n is a positive whole number;
q and r are the same or different at each occurrence and are whole numbers from 0 to 3 with the proviso that the sum of q and r at each occurrence is equal to 3;
o and p are the same or different at each occurrence and are positive whole numbers from 0 to 4, with the proviso that the sum of o and p is equal to 4;
—X— is a divalent organic radical; and
R₃ is the same or different at each occurrence and is a substituent other than hydrogen which is unreactive under conditions necessary to crosslink cyanurate moieties,
wherein said resin forms no or substantially no solids which are insoluble in tetrahydrofuran after storage at about 20° C. for a period within the range of more than about 3 days to 90 days.

77. A resin according to claim 76 wherein said resin forms no or substantially no solids which are insoluble in tetrahydrofuran on storage at about 20° C. for about 90 days.

78. A resin according to claim 77 wherein said resin forms no or substantially no solids which are insoluble in tetrahydrofuran on storage at about 20° C. for more than about 90 days.

79. A resin according to claim 76 wherein Z is hydrogen and —CN and from about 20 to about 100 mole percent of Z are —CN.

80. A resin according to claim 75 wherein X is substituted or unsubstituted methylene or 1,4-phenyldimethylene, wherein permissible substituents are alkyl groups having from 1 to about 10 carbon atoms, halogen, and furyl.

81. A resin according to claim 75 wherein X is methylene or methylene substituted with furfuryl, alkyl having from 1 to about 10 carbon atoms or halogen or is a moiety of the formula $$-CH_2-\langle\bigcirc\rangle-CH_2, -O-, -\overset{O}{\underset{O}{\overset{\|}{S}}}-, -S-,$$

$$-\overset{O}{\overset{\|}{C}}- \text{ or } -O\overset{O}{\overset{\|}{C}}-$$

82. A resin according to claim 75 wherein N is from 1 to about 10.

83. A resin according to claim 76 wherein:
o is 0 or 1; and
p is 2 to 4.

84. A resin according to claim 76 wherein:
q is 0 or 1; and
r is 2 to 3.

85. A resin according to claim 76 wherein $R_3$ is alkyl.

86. A completely cured composition formed by cyclotrimerization of the composition of claim 76.

87. A partially cured composition formed by cyclotrimerization of the composition of claim 76.

88. An incompletely cured composition formed by cyclotrimerization of the composition of claim 76.

89. A resin according to claim 76 containing one or more fillers.

90. A resin according to claim 21 wherein the mole % of phenyl groups substituted with carbamate functions is less than about 2 mole %.

91. A resin according to claim 90 where none or substantially none of the phenyl groups are substituted with carbamate functions.

92. A resin according to claim 38 which comprises less than 2 wt % dicyanamide.

93. A resin according to claim 92 which comprises less than about 1 wt % dicyanamide.

94. A resin according to claim 93 which comprises no dicyanamide or substantially no dicyanamide.

95. A composition comprising a phenolic resin according to claim 38 and one or more fillers.

96. A completely cured composition formed by cyclotrimerization of the resin of claim 38.

97. A partially cured composition formed by cyclotrimerization of the resin of claim 38.

98. An incompletely cured composition formed by cyclotrimerization of the resin of claim 38.

99. A resin according to claim 38 wherein Z is hydrogen and —CN and from about 20 to about 100 mole percent of Z are —CN.

100. A resin according to claim 99 wherein from about 35 to about 80 mole percent of Z are —CN.

101. A resin according to claim 38 wherein X is substituted or unsubstituted methylene or 1,4-phenyldimethylene, wherein permissible substituents are alkyl groups having from 1 to about 10 carbon atoms, halogen, and furyl.

102. A resin according to claim 38 wherein X is methylene or methylene substituted with furfuryl, alkyl having from 1 to about 10 carbon atoms or halogen or is a moiety of the formula $$-CH_2-\langle\bigcirc\rangle-CH_2, -O-, -\overset{O}{\underset{O}{\overset{\|}{S}}}-, -S-,$$

$$-\overset{O}{\overset{\|}{C}}- \text{ or } -O\overset{O}{\overset{\|}{C}}-$$

103. A resin according to claim 38 wherein n is from 1 to about 10.

104. A resin according to claim 103 wherein n is from about 6 to about 10.

105. A resin according to claim 38 wherein:
o is 0 or 1; and
p is 2 to 4.

106. A resin according to claim 38 wherein:
q is 0 or 1; and
r is 2 or 3.

107. A resin according to claim 38 wherein $R_3$ is alkyl.

108. A resin according to claim 40 wherein the amount of residual phenyl cyanate is less than about 1 % by weight.

109. A resin according to claim 108 wherein the amount of residual phenyl cyanate is less than about 0.5% by weight.

110. A resin according to claim 1 wherein Z is hydrogen and —CN and from about 20 to about 100 mole percent of Z are —CN.

111. A resin according to claim 110 wherein from about 35 to about 80 mole percent of Z are —CN.

112. A resin according to claim 1 wherein X is substituted or unsubstituted methylene or 1,4-phenyldimethylene, wherein permissible substituents are alkyl groups having from 1 to about 10 carbon atoms, halogen, and furyl.

113. A resin according to claim 21 wherein X is methylene substituted with furfuryl, alkyl having from 1 to about 10 carbon atoms or halogen or is a moiety of the formula $$-CH_2-\langle\bigcirc\rangle-CH_2, -O-, -\overset{O}{\underset{O}{\overset{\|}{S}}}-, -S-,$$

$$-\overset{O}{\overset{\|}{C}}- \text{ or } -O\overset{O}{\overset{\|}{C}}-$$

114. A resin according to claim 40 wherein n is from 1 to about 10.

115. A resin according to claim 114 wherein n is from about 6 to about 10.

116. A resin according to claim 40 wherein:
o is 0 or 1; and
p is 2 to 4.

117. A resin according to claim 40 wherein:
q is 0 or 1; and
r is 2 or 3.

118. A resin according to claim 40 wherein $R_3$ is alkyl.

119. A completely cured composition formed by cyclotrimerization of the composition of claim 40.

120. A partially cured composition formed by cyclotrimerization of the composition of claim 40.

121. An incompletely cured composition formed by cyclotrimerization of the composition of claim 40.

122. A resin according to claim 40 containing one or more fillers.

* * * * *